United States Patent
Dighe

(10) Patent No.: US 9,440,162 B2
(45) Date of Patent: *Sep. 13, 2016

(54) SYSTEM AND METHOD FOR WATER TREATMENT

(75) Inventor: Shyam V. Dighe, North Huntingdon, PA (US)

(73) Assignee: Aquasource Technologies Corporation, North Huntingdon, PA (US)

( * ) Notice: Subject to any disclaimer, the term of this patent is extended or adjusted under 35 U.S.C. 154(b) by 841 days.

This patent is subject to a terminal disclaimer.

(21) Appl. No.: 13/613,329

(22) Filed: Sep. 13, 2012

(65) Prior Publication Data

US 2013/0062188 A1 Mar. 14, 2013

Related U.S. Application Data

(60) Provisional application No. 61/573,900, filed on Sep. 14, 2011, provisional application No. 61/573,957, filed on Sep. 14, 2011, provisional application No. 61/573,958, filed on Sep. 14, 2011, provisional application No. 61/573,956, filed on Sep. 14, 2011, provisional application No. 61/573,955, filed on Sep. 14, 2011, provisional application No. 61/573,954, filed on Sep. 14, 2011, provisional application No. 61/573,953, filed on Sep. 14, 2011, provisional application No. 61/573,952, filed on Sep. 14, 2011.

(Continued)

(51) Int. Cl.
*C02F 1/04* (2006.01)
*B01D 1/26* (2006.01)
(Continued)

(52) U.S. Cl.
CPC .............. *B01D 1/26* (2013.01); *B01D 1/0058* (2013.01); *B01D 1/16* (2013.01); *B01D 1/305* (2013.01);
(Continued)

(58) Field of Classification Search
CPC ............ C02F 1/04; C02F 1/048; C02F 1/06; C02F 2001/5218; B01D 1/26; B01D 3/06; B01D 3/065
See application file for complete search history.

(56) References Cited

U.S. PATENT DOCUMENTS 2,441,361 A 5/1948 Kirgan
3,119,752 A 1/1964 Checkovich
(Continued)

FOREIGN PATENT DOCUMENTS

EP 1 770 068 4/2007
EP 1 775 265 4/2007
(Continued)

OTHER PUBLICATIONS

Notification of Transmittal of the International Search Report and the Written Opinion of the International Searching Authority, International Search Report and Written Opinion of the International Searching Authority for PCT/US2012/055175, dated Jan. 9, 2013 (12 pages).

(Continued)

*Primary Examiner* — In Suk Bullock
*Assistant Examiner* — Jonathan Miller
(74) *Attorney, Agent, or Firm* — Buchanan Ingersoll & Rooney PC

(57) ABSTRACT

A system and method for treating waste water includes: receiving waste water at a first pressure and a first temperature, the waste water including dissolved solids and volatile organic compounds; pressurizing, by a pump, the received waste water to a second pressure greater than the first pressure; preheating, by a preheater, the pressurized waste water to produce distilled water and a pressurized/preheated waste water; heating, by a heater, the pressurized/preheated waste water to a second temperature greater than the first temperature to produce pressurized/heated waste water; removing, by a flash evaporator, dissolved solids from the pressurized/heated waste water by evaporation to produce steam and brine water, wherein the brine water has a total dissolved solids content greater than a total dissolved solids content of the received waste water; and crystallizing, by a plasma crystallizer, the brine water to produce a solid mass of waste product and steam.

21 Claims, 7 Drawing Sheets

(51) Int. Cl.
| | |
|---|---|
| *B01D 1/00* | (2006.01) |
| *B01D 1/16* | (2006.01) |
| *B01D 1/30* | (2006.01) |
| *B01D 3/06* | (2006.01) |
| *B01D 5/00* | (2006.01) |
| *C02F 1/06* | (2006.01) |
| *C02F 1/16* | (2006.01) |
| *C02F 1/52* | (2006.01) |
| *C02F 103/10* | (2006.01) |

(52) U.S. Cl.
CPC ............... *B01D 3/06* (2013.01); *B01D 3/065* (2013.01); *B01D 5/0039* (2013.01); *C02F 1/048* (2013.01); *C02F 1/06* (2013.01); *C02F 1/16* (2013.01); *C02F 2001/5218* (2013.01); *C02F 2103/10* (2013.01); *C02F 2209/02* (2013.01); *C02F 2209/03* (2013.01); *C02F 2301/063* (2013.01)

(56) References Cited

U.S. PATENT DOCUMENTS

| | | | |
|---|---|---|---|
| 3,186,924 A | 6/1965 | Williamson | |
| 3,197,387 A | 7/1965 | Lawrance | |
| 3,203,464 A | 8/1965 | Kingma | |
| 3,213,000 A | 10/1965 | Ewing | |
| 3,216,910 A | 11/1965 | Langer et al. | |
| 3,285,832 A | 11/1966 | Sephton | |
| 3,337,419 A | 8/1967 | Kogan | |
| 3,342,697 A | 9/1967 | Hammond | |
| 3,360,442 A | 12/1967 | Starmer | |
| 3,396,086 A | 8/1968 | Starmer | |
| 3,433,717 A | 3/1969 | Loebel | |
| 3,434,522 A | 3/1969 | Laurenty | |
| 3,442,765 A | 5/1969 | Levite | |
| 3,487,873 A | 1/1970 | Bromley et al. | |
| 3,488,260 A | 1/1970 | Gilbert | |
| 3,488,686 A | 1/1970 | Dunwoody et al. | |
| 3,586,090 A | 6/1971 | Henderson | |
| 3,607,135 A | 9/1971 | Gereth et al. | |
| 3,627,646 A | 12/1971 | Osdor | |
| 3,634,199 A | 1/1972 | Van Winkle | |
| 3,664,145 A | 5/1972 | Johnson | |
| 3,690,116 A | 9/1972 | Cheng et al. | |
| 3,734,160 A | 5/1973 | Osdor | |
| 3,763,014 A | 10/1973 | Barba et al. | |
| 3,844,899 A | 10/1974 | Sager, Jr. | |
| 3,855,072 A | 12/1974 | Liu | |
| 3,884,767 A | 5/1975 | Pottharst, Jr. | |
| 3,912,578 A | 10/1975 | Didycz et al. | |
| 3,926,739 A | 12/1975 | Izumi | |
| 3,933,597 A | 1/1976 | Barba et al. | |
| 3,946,495 A | 3/1976 | Osdor | |
| 3,951,753 A | 4/1976 | Roller | |
| 3,970,820 A | 7/1976 | Mahl | |
| 4,010,018 A | 3/1977 | Kantor | |
| 4,017,421 A | 4/1977 | Othmer | |
| 4,035,243 A | 7/1977 | Katz et al. | |
| 4,043,130 A | 8/1977 | Brown et al. | |
| 4,055,145 A | 10/1977 | Mager et al. | |
| 4,078,976 A | 3/1978 | Spears, Jr. | |
| 4,083,781 A | 4/1978 | Conger | |
| 4,105,505 A | 8/1978 | Saari | |
| 4,136,530 A | 1/1979 | Kantor | |
| 4,141,825 A | 2/1979 | Conger | |
| 4,162,945 A | 7/1979 | Hofstede et al. | |
| 4,186,058 A | 1/1980 | Katz et al. | |
| 4,186,060 A | 1/1980 | Katz et al. | |
| 4,282,067 A | 8/1981 | Katz et al. | |
| 4,287,019 A | 9/1981 | Standiford | |
| 4,312,710 A | 1/1982 | Tanaka et al. | |
| 4,315,402 A | 2/1982 | Sadhukhan | |
| 4,318,780 A | 3/1982 | Bailie | |
| 4,319,964 A | 3/1982 | Katz et al. | |
| 4,332,642 A | 6/1982 | Cane et al. | |
| 4,334,961 A | 6/1982 | Moen et al. | |
| 4,346,490 A | 8/1982 | Katz et al. | |
| 4,367,639 A | 1/1983 | Kantor | |
| 4,390,670 A | 6/1983 | Walinsky | |
| 4,414,341 A | 11/1983 | Williams | |
| 4,440,601 A | 4/1984 | Katz et al. | |
| 4,441,337 A | 4/1984 | Kantor | |
| 4,474,142 A | 10/1984 | Bharathan | |
| 4,485,223 A | 11/1984 | Walinsky | |
| 4,524,587 A | 6/1985 | Kantor | |
| 4,547,559 A | 10/1985 | Walinsky | |
| 4,591,413 A | 5/1986 | Peterson | |
| 4,641,607 A | 2/1987 | Balazs et al. | |
| 4,659,475 A | 4/1987 | Liao et al. | |
| 4,710,537 A | 12/1987 | Walinsky | |
| 4,731,164 A | 3/1988 | Williamsom | |
| 4,750,983 A | 6/1988 | Foster et al. | |
| 4,795,532 A | 1/1989 | Mizutani et al. | |
| 4,941,330 A | 7/1990 | Williamson | |
| 5,032,646 A | 7/1991 | Walinsky | |
| 5,133,837 A | 7/1992 | Elmore et al. | |
| 5,167,838 A | 12/1992 | Wilensky | |
| 5,211,724 A * | 5/1993 | Khan et al. | 48/197 R |
| 5,232,603 A | 8/1993 | Denzinger et al. | |
| 5,453,306 A | 9/1995 | Tatsumi et al. | |
| 5,493,630 A | 2/1996 | Mariner et al. | |
| 5,495,550 A | 2/1996 | Mariner et al. | |
| 5,513,494 A | 5/1996 | Flynn et al. | |
| 5,537,507 A | 7/1996 | Mariner et al. | |
| 5,622,605 A | 4/1997 | Simpson et al. | |
| 5,637,127 A | 6/1997 | McLaughlin et al. | |
| 5,658,993 A | 8/1997 | Denzinger et al. | |
| 5,671,322 A | 9/1997 | Finicle | |
| 5,681,615 A | 10/1997 | Affinito et al. | |
| 5,755,855 A | 5/1998 | Baker et al. | |
| 5,861,049 A | 1/1999 | Lokhandwala | |
| 5,887,117 A | 3/1999 | Desu et al. | |
| 5,902,641 A | 5/1999 | Affinito et al. | |
| 5,925,223 A | 7/1999 | Simpson et al. | |
| 6,187,206 B1 | 2/2001 | Bernier et al. | |
| 6,229,956 B1 | 5/2001 | Morris | |
| 6,404,982 B1 | 6/2002 | Mariner et al. | |
| 6,622,523 B2 | 9/2003 | Ludwig et al. | |
| 6,919,000 B2 | 7/2005 | Klausner et al. | |
| 7,081,205 B2 | 7/2006 | Gordon et al. | |
| 7,189,436 B2 | 3/2007 | Kohler et al. | |
| 7,225,620 B2 | 6/2007 | Klausner et al. | |
| 7,328,591 B2 | 2/2008 | Holtzapple et al. | |
| 7,416,666 B2 | 8/2008 | Gordon | |
| 7,455,778 B2 | 11/2008 | Gordon | |
| 7,476,323 B2 | 1/2009 | Gordon | |
| 7,510,658 B2 | 3/2009 | Gordon | |
| 7,678,227 B2 | 3/2010 | Alt | |
| 7,708,865 B2 | 5/2010 | Holtzapple et al. | |
| 7,828,883 B2 | 11/2010 | Aines et al. | |
| 7,850,826 B2 | 12/2010 | Alt | |
| 7,922,873 B2 | 4/2011 | St. Germain et al. | |
| 7,950,250 B2 | 5/2011 | Holtzapple et al. | |
| 7,954,322 B2 | 6/2011 | Henderson | |
| 7,967,955 B2 * | 6/2011 | Heins | 203/12 |
| 8,097,128 B1 | 1/2012 | Sherry | |
| 2004/0038808 A1 * | 2/2004 | Hampden-Smith | B01J 21/18 502/180 |
| 2009/0020481 A1 | 1/2009 | Bailie et al. | |

FOREIGN PATENT DOCUMENTS

| | | |
|---|---|---|
| JP | 55059879 | 5/1980 |
| WO | 0250215 | 6/2002 |
| WO | 2006123258 | 11/2006 |
| WO | 2010133840 | 11/2010 |
| WO | 2012085860 | 6/2012 |
| WO | 2012127250 | 9/2012 |

OTHER PUBLICATIONS

Notification of Transmittal of the International Search Report and the Written Opinion of the International Searching Authority, Inter-

(56) References Cited

OTHER PUBLICATIONS national Search Report and Written Opinion of the International Searching Authority for PCT/US2012/055187, dated Dec. 17, 2012 (22 pages).
Notification of Transmittal of the International Search Report and the Written Opinion of the International Searching Authority, International Search Report and Written Opinion of the International Searching Authority for PCT/US2012/055191, dated Jan. 15, 2013 (14 pages).
Notification of Transmittal of the International Search Report and the Written Opinion of the International Searching Authority, International Search Report and Written Opinion of the International Searching Authority for PCT/US2012/055194, dated Jan. 22, 2013 (14 pages).
Supplementary European Search Report and Annex to the European Search Report on European Patent Application No. EP 12 83 2155, dated Jun. 25, 2015 (8 pages).
Supplementary European Search Report and Annex to the European Search Report on European Patent Application No. EP 12 83 2522, dated Jul. 20, 2015 (9 pages).
Supplementary European Search Report and Annex to the European Search Report on European Patent Application No. EP 12 83 1074, dated Jul. 14, 2015 (7 pages).
Supplementary European Search Report and Annex to the European Search Report on European Patent Application No. EP 12 83 1350, dated Jul. 14, 2015 (9 pages).

\* cited by examiner

SYSTEM AND METHOD FOR WATER TREATMENT

CROSS-REFERENCE TO RELATED APPLICATIONS

This patent application claims the benefit of U.S. Provisional Patent Application Nos. 61/573,900, 61/573,957, 61/573,958, 61/573,956, 61/573,955, 61/573,954, 61/573,953 and 61/573,952, all filed on Sep. 14, 2011, the disclosures of which are hereby incorporated by reference in their entireties.

FIELD OF THE INVENTION

The present invention is generally directed toward the treatment of water and, more particularly, toward the treatment of water containing large amounts of dissolved solids as may result, for example, from use of the water as a fracking fluid used in drilling gas wells. However, the embodiment proposed herein may be used in any situation where impurities to be removed from water exist.

BACKGROUND OF THE INVENTION

Ensuring a supply of potable water has been a frequent concern in many locations. Further concerns arise about the environmental impact of the disposal of contaminated water.

Conventional water treatment techniques for such purposes as, for example, municipal water treatment and/or obtaining potable water from sea water are known and are successful in many instances. However, some current activities show those techniques to have limited cost effectiveness.

For example, mining with water used to fracture rock or shale formations to recover natural gas (e.g., in the shale regions in the United States and western Canada, including, but not limited to, Pennsylvania, Maryland, New York, Texas, Oklahoma, West Virginia and Ohio) requires a very large amount of water input and a significant amount of return (flowback) water that contains a great deal of contaminants and impurities. In order for this flowback water to be used in an environmentally responsible manner, it needs to be relatively free of contaminants/impurities. Water used, for example, in natural gas well drilling and production may contain organic materials, volatile and semi-volatile compounds, oils, metals, salts, etc. that have made economical treatment of the water to make it potable or reusable, or even readily and safely disposable, more difficult. It is desirable to remove or reduce the amount of such contaminants/impurities in the water to be re-used, and also to remove or reduce the amount of such contaminants/impurities in water that is disposed of.

The present invention is directed toward overcoming one or more of the above-identified problems.

SUMMARY OF THE INVENTION

The present invention can take numerous forms among which are those in which waste water containing a large amount of solids, including, for example, dissolved salts, is pressurized to allow considerable heat to be applied before the water evaporates, and is then subjected to separation and recovery apparatus to recover relatively clean water for reuse and to separate solids that include the afore-mentioned dissolved salts. In some instances, the concentrated solids may be disposed of as is, e.g., in a landfill. Where that is not acceptable (e.g., for reasons of leaching of contaminants), the concentrated solids may be supplied to a thermal, pyrolytic, reactor (referred to herein as a "crystallizer") for transforming them into a vitrified mass which can be placed anywhere glass is acceptable.

Particular apparatus for systems and processes in accordance with the present invention can be adapted from apparatus that may be presently currently available, but which has not been previously applied in the same manner. As an example, conventional forms of flash evaporation equipment, such as are used for treating sea water, in one or in multiple stages, may be applied herein as a salts concentration apparatus. Likewise, conventional forms of gasification/vitrification reactors, such as are used for municipal solid waste ("MSW") processing including, but not limited, to plasma gasification/vitrification reactors, may be applied for final separation of the contaminants from the water and for initial heating of the waste water.

The present disclosure presents examples of such systems and processes in which, in one or more successive concentration stages, steam output of a flash evaporator used to concentrate salts is supplied, for example, at atmospheric pressure (14.7 psia or 1 atm), to a preheater for incoming water to be heated prior to flash evaporation.

A method for treating waste water is disclosed, the method including the steps of: (a) receiving waste water at a first pressure and a first temperature, the waste water comprising dissolved solids, volatile organic compounds and other components generally and collectively called impurities; (b) pressurizing the received waste water to a second pressure greater than the first pressure; (c) heating the pressurized waste water to a second temperature greater than the first temperature, wherein said heating step produces distilled water and pressurized/heated waste water without boiling of the waste water across heat transfer surfaces; and (d) removing dissolved solids from the pressurized/heated waste water by evaporation caused by depressurization of the waste water to produce steam and brine water, wherein the brine water has a total dissolved solids content greater than a total dissolved solids content of the received waste water.

In one form, step (c) may include the steps of: (c1) preheating the pressurized waste water to a third temperature greater than the first temperature but less than the second temperature without boiling of the waste water across heat transfer surfaces, wherein said preheating step produces the distilled water; and (c2) further heating the pressurized/preheated waste water to the second temperature without boiling of the waste water across heat transfer surfaces before applying the removing step.

The first pressure may be approximately 0.8-1.2 atm (preferably approximately 1.0 atm), and the first temperature may be approximately 48-72° F. (preferably 60° F.).

The second pressure may be approximately 8-12 atm (preferably 10 atm), and the second temperature may be approximately 240-360° F. (preferably 300° F.).

In another form, the steam produced by step (d), when cooled, produces distilled water. Additionally, the steam produced by step (d) may be used as a heat source in at least one of steps (b) and (c).

In a further form, steps (a)-(d) comprise a stage, and wherein the method is performed in multiple stages with the brine water output by step (d) in one stage used as the received waste water in step (a) of a next stage. The brine water output in step (d) of each stage has a total dissolved solids content that is higher than that of a previous stage.

In yet a further form, the method further includes the steps of: (e) crystallizing the brine water to produce a solid mass of waste product and steam. The steam produced by step (e) may be used as a heat source in at least one of steps (b) and (c). A plasma crystallizer using a plasma torch may be used to crystallize the brine water. The solid mass of waste product may include a vitrified glass of the salts in the brine water.

In still a further form, the method further includes the steps of: (b') prior to step (b), removing the volatile organic compounds from the received waste water, wherein the removed volatile organic compounds are used as a heat source by the plasma torch to crystallize the brine water. The steam produced by step (e) may be used as a heat source in step (b').

A system for treating waste water is also disclosed, the system including: a pump receiving waste water at a first pressure and a first temperature and pressurizing the received waste water to a second pressure greater than the first pressure, the waste water comprising dissolved solids, volatile organic compounds and other components generally and collectively called impurities; a preheater receiving the pressurized waste water from the pump and preheating the pressurized waste water to produce distilled water and pressurized/preheated waste water without boiling of the waste water across heat transfer surfaces; a heater heating the pressurized/preheated waste water to a second temperature greater than the first temperature to produce pressurized/heated waste water without boiling of the waste water across heat transfer surfaces; and an evaporator removing dissolved solids from the pressurized/heated waste water by evaporation caused by depressurization of the waste water to produce steam and brine water, wherein the brine water has a total dissolved solids content greater than a total dissolved solids content of the received waste water. The evaporator may include a flash evaporator.

The first pressure may be approximately 0.8-1.2 atm (preferably approximately 1.0 atm), and the first temperature may be approximately 48-72° F. (preferably 60° F.).

The second pressure may be approximately 8-12 atm (preferably 10 atm), and the second temperature may be approximately 240-360° F. (preferably 300° F.).

In one form, the steam produced by the evaporator may include distilled water. The steam produced by the evaporator may be used as a heat source by at least one of the preheater and the heater.

In another form, the pump, preheater, heater and evaporator comprise a stage, and wherein the system comprises multiple stages with the brine water output by one stage used as the received waste water of a next stage. The brine water output by each stage has a total dissolved solids content that is higher than that of a previous stage.

In a further form, the system further includes a crystallizer crystallizing the brine water to produce a solid mass of waste product and steam. The steam produced by the crystallizer is used as a heat source by at least one of the preheater and heater. The solid mass of waste product may include a vitrified glass of the salts in the brine water.

In yet a further form, the crystallizer includes a plasma crystallizer and includes a plasma torch for vaporizing the water from the brine water and producing the solid mass of waste product and steam.

In still a further form, the system further includes a stripper initially receiving the waste water and removing volatile organic compounds from the waste water prior to the waste water being pressurized by the pump, wherein the removed volatile organic compounds are used as a heat source by the plasma torch to crystallize the brine water. The steam produced by the crystallizer may be used as a heat source by the stripper.

Further explanations and exemplary embodiments of various aspects of the present invention are presented in the following disclosure.

It is an object of the present invention to provide a system and method for the economic and environmental treatment of waste water.

Various other objects, aspects and advantages of the present invention can be obtained from a study of the specification, the drawings, and the appended claims.

BRIEF DESCRIPTION OF THE DRAWINGS

Further possible embodiments are shown in the drawings. The present invention is explained in the following in greater detail as an example, with reference to exemplary embodiments depicted in drawings. In the drawings.

DETAILED DESCRIPTION OF THE INVENTION

Figure 1:
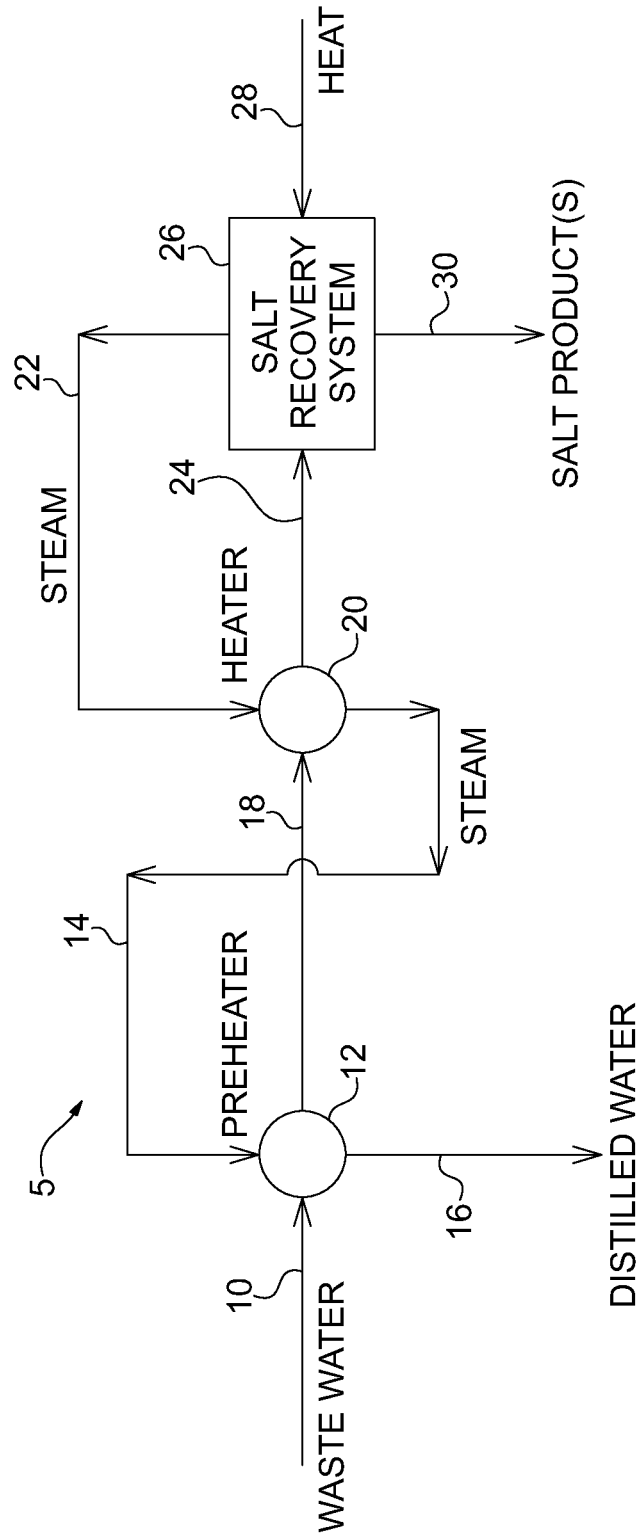
FIG. 1 is a generalized schematic diagram of an exemplary system for water treatment in accordance with the present invention.

Referring to FIG. 1, a general overview of the inventive system and corresponding process is shown generally at 5. As shown in FIG. 1, waste water is supplied via a conduit 10 to a preheater 12 (e.g., a shell and tube heat exchanger) in which the initial waste water is heated by steam that is supplied through a conduit 14. A portion of the treated waste water exits the preheater 12 as distilled water via an outlet conduit 16. Other examples presented and described below illustrate pressurization of the waste water before it is preheated, which offers advantages that will be described. Also, more than one preheater 12 in series and/or parallel flow configurations may be utilized without departing from the spirit and scope of the present invention. Further, the preheater(s) 12 may utilize steam from different sources, e.g., steam from the heater 20 (as shown in FIG. 1) or excess steam from the crystallizer 80, (see FIG. 5), etc.

The portion of the heated waste water that does not exit the preheater 12 as distilled water 16 exits the preheater 12 via conduit 18 and is supplied to a further heater (or heat exchanger) 20. The heater 20 receives steam supplied through a conduit 22 that exits the heater 20 via conduit 14 and is supplied to the preheater 12.

The heated waste water exits the heater 20 via a conduit 24 and is supplied to a subsystem 26, herein referred to as a Salt Recovery System ("SRS"). Examples of equipment for the SRS 26 and their operation will be described subsequently herein. One principal function of the SRS 26 is to utilize (or consume) heat represented as an input 28 that volatilizes water from the waste water stream (and possibly some other water input) to form steam supplied to the heater 20 via conduit 22. Another function of the SRS 26 is to separate out (or at least concentrate) salts of the waste water that are supplied from the heater 20 via conduit 24 and produce salt product(s) at an output 30.

The salt products 30 of the SRS 26 may be in the form of a solid mass or within a brine solution subjected to disposition or other treatment. Alternatively, as will be described, the SRS 26 may include apparatus for vitrification of the salt products, or the apparatus for vitrification of the salt products may be included as an additional component.

Figure 2:
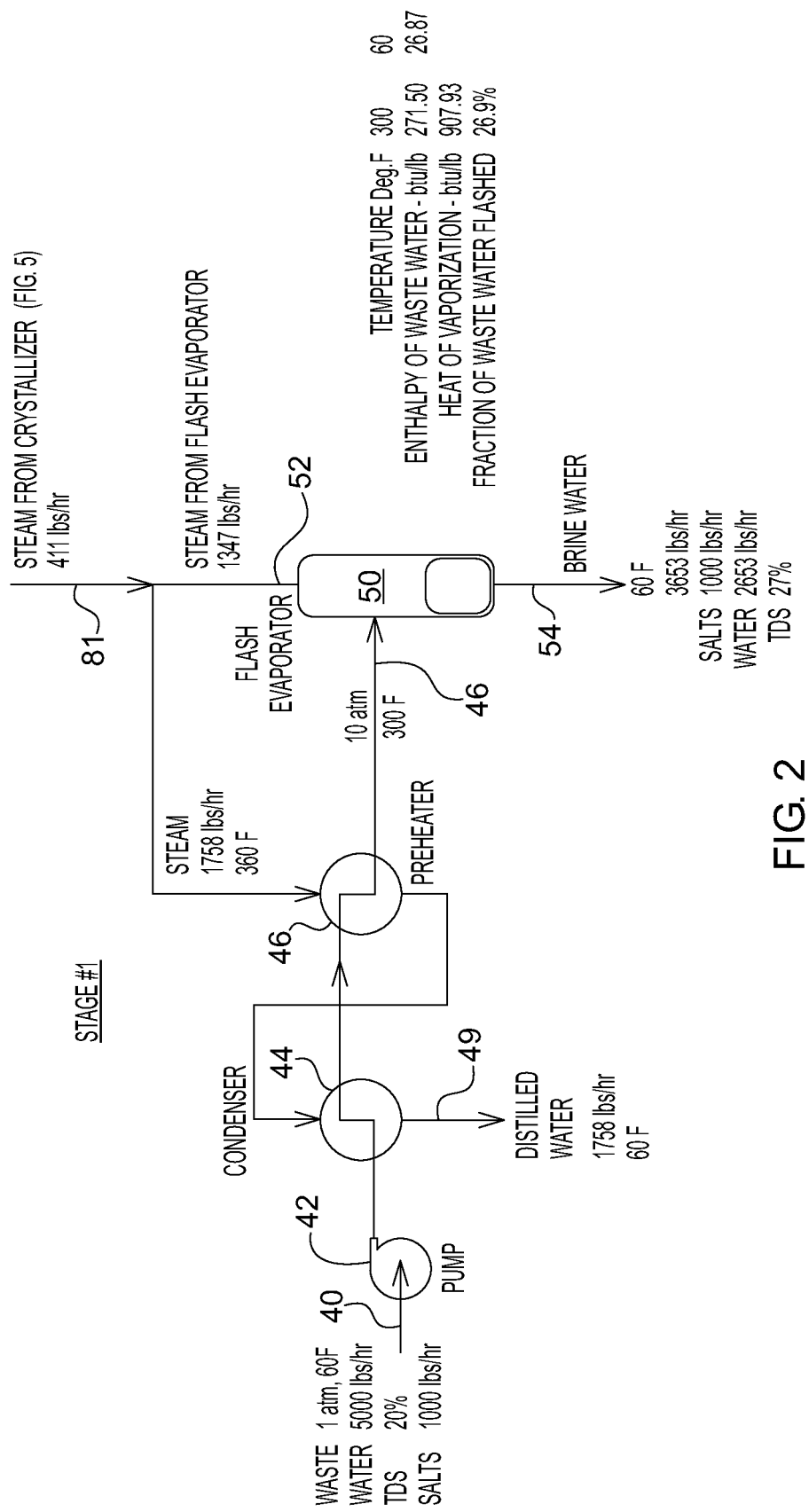
FIGS. 2, 3 and 4 are schematic flow diagrams of particular examples of various stages of a treatment system in accordance with the present invention.
Figure 3:
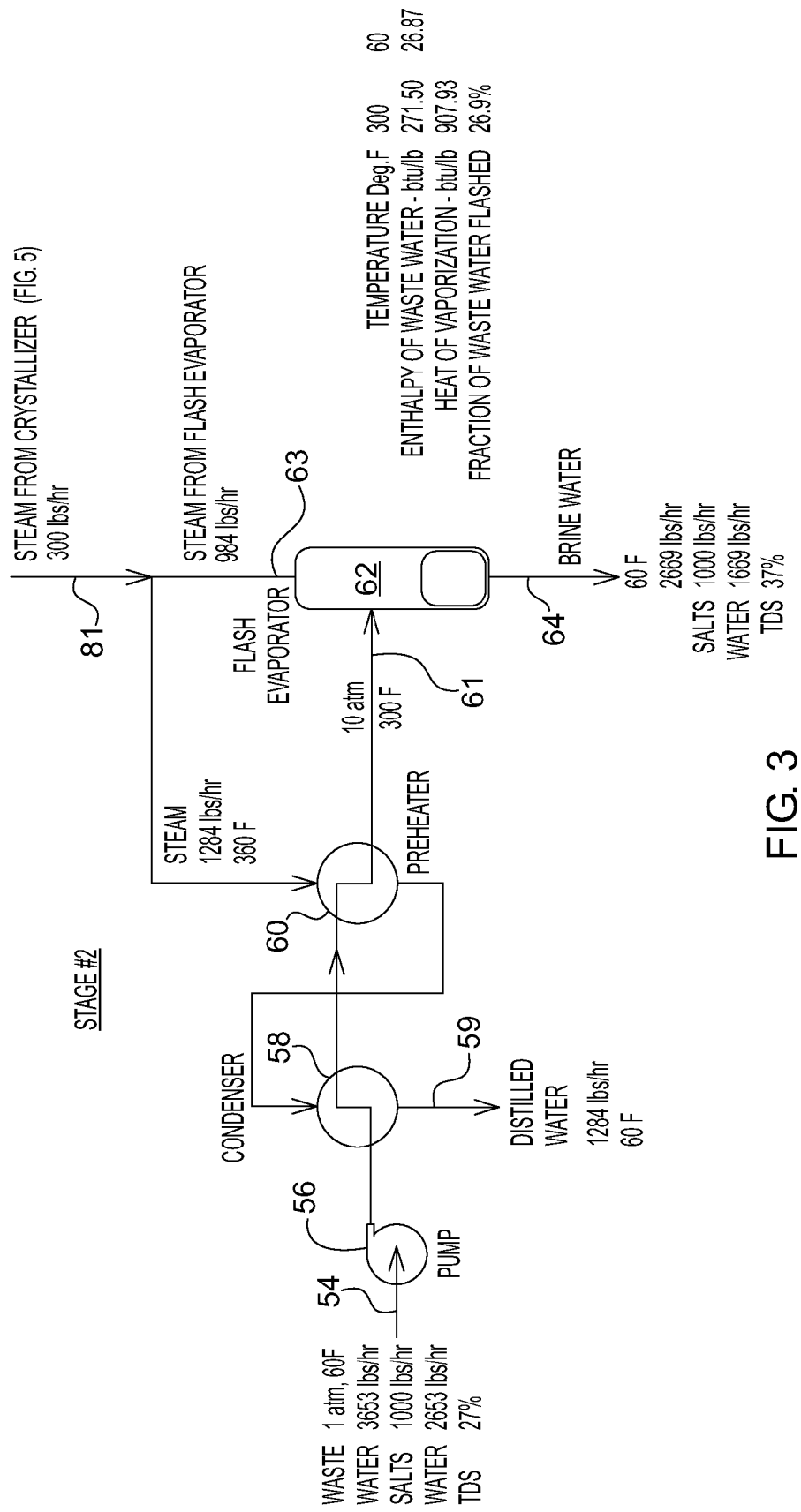
Figure 4:
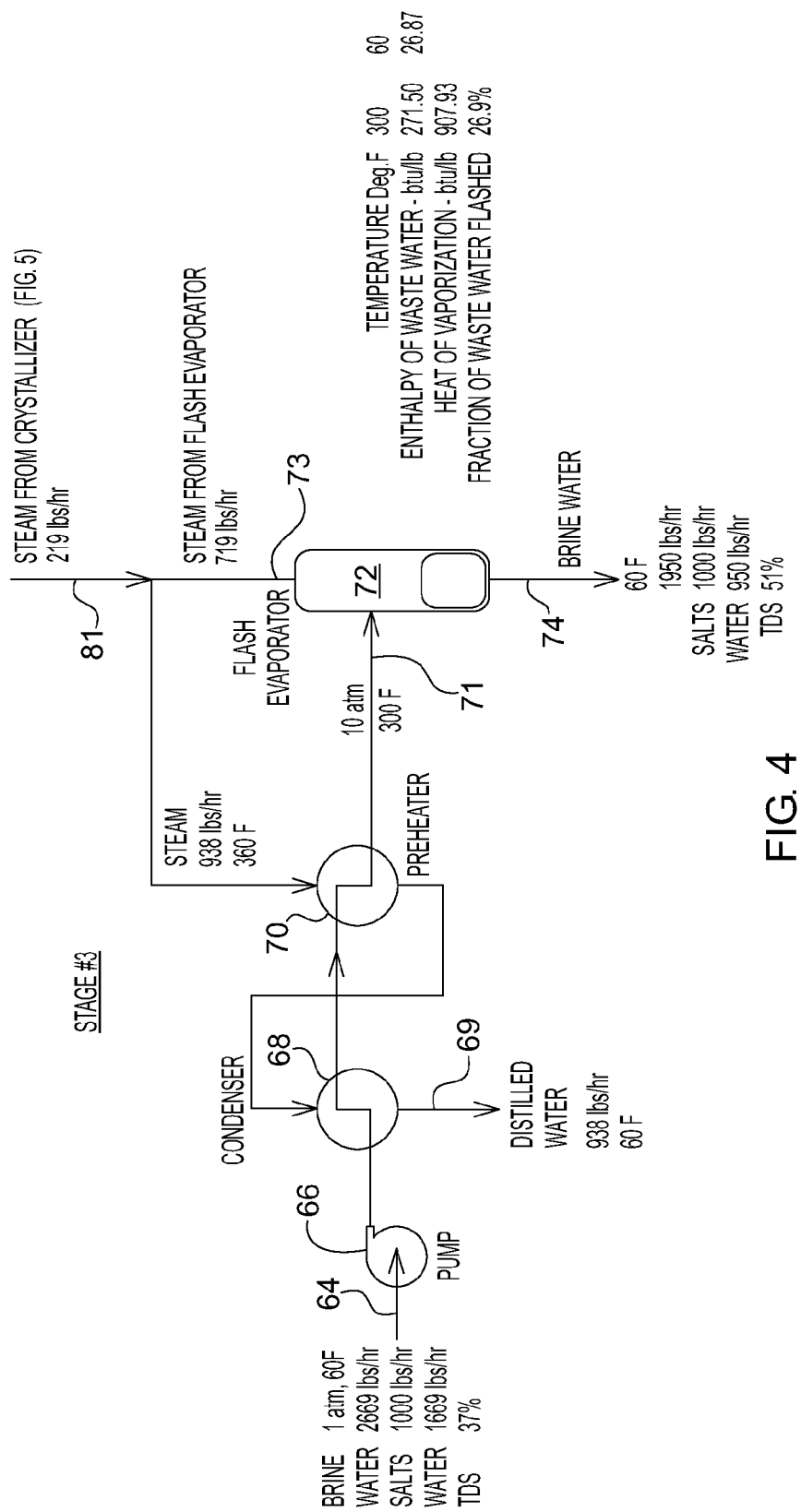

FIGS. 2, 3 and 4 will be individually discussed, but first their general relation to each other in an exemplary multistage system will be described. FIG. 2 shows Stage #1. This first stage takes in waste water at an inlet 40, processes it and produces first stage brine water at an outlet 54 of the first stage. The first stage brine water from the outlet 54 is input to the second stage shown in FIG. 3 (Stage #2) for additional processing, and a resulting second stage brine water is produced as an output at outlet 64. Similarly, the brine water from outlet 64 of the second stage is supplied as an input to the third stage shown in FIG. 4 (Stage #3) that has additional processing, resulting in a third stage output of brine water at an outlet 74.

It will be seen and appreciated by one skilled in the art how the processing of waste water through the successive stages of FIGS. 2, 3 and 4 increase the concentration of salts in the brine water (e.g., Total Dissolved Solids—"TDS"). It will also be appreciated how the number of stages is a variable that can be chosen according to various factors including, but not limited to, the salts content of the original waste water and the desired salt content after concentration. In general, a system in accordance with these exemplary embodiments may include any one or more stages such as are shown, for example, in FIGS. 2-4. The examples presented herein are merely illustrative of systems and methods that may be chosen not merely for good technical performance but also for reasons relating to economic factors, such as, for example, initial capital cost and operating cost, as well as convenience factors, such as, for example, space requirements and portability. While three stages are shown and described herein, one skilled in the art will appreciate that any number of stages may be utilized depending on the particular application without departing from the spirit and scope of the present invention.

Each of the FIGS. 2-5, merely by way of further example and without limitation, are described in this specification, and include legends, including numerical values (all of which are merely representative approximations and are not necessarily exact technical values and/or calculations). Further, these legends are not necessarily the only suitable values that represent the nature and characteristics of materials as applied to, affected by, and resulting from the operations of the exemplary system(s). Not all such legends will be repeated in this text, although all form a part of this disclosure and are believed understandable to persons of ordinary skill in water treatment and thermal processes. As appreciated by one skilled in the art, such data are sometimes referred to as heat and material balances. It is specifically to be understood and will be appreciated by one skilled in the art that the various values indicated in the legends may have a tolerance of ±20%, as they are representative approximations and not exact technical values.

Referring to FIG. 2, which shows Stage #1, waste water at the inlet 40 is supplied at approximately a pressure of 1 atm and a temperature of 60° F., with 20% TDS to a condenser 44 through a pump 42. The waste water 40 is pressurized by the pump 42 and processed by the condenser 44 (which may be a series of heat exchangers that may utilize steam from different sources, e.g., steam from preheater 46 as shown in FIG. 2 and/or excess steam from crystallizer 80 (see FIG. 5)) and the preheater 46 (which may be a series of heat exchangers to optimize the heat transfer between the steam and the waste water) to a pressure of approximately 10 atm and a temperature of approximately 300° F. at an inlet 48 to a flash evaporator 50. Under certain operating conditions, the steam addition from the crystallizer 80 may be negative, i.e., steam is sent as excess to the crystallizer 90 for other uses (e.g., as a heat source for the stripper 100).

The level of pressurization of waste water in all Stages is such that there is no boiling of the waste water inside and across the heat exchanger surfaces of both the condenser 44 and preheater 46. This is done to prevent the formation of deposits (scales, fouling, etc.) on the heat exchanger surfaces. The condenser 44 also outputs clean, distilled water at output 49 that is generally free from contaminants/impurities. The flash evaporator 50 generates steam from the waste water at outlet 52, which may be applied to the preheater 46. The flash evaporator 50 also processes the waste water 48 and outputs a brine water from another outlet 54 that has salts concentrated to about 27% TDS.

FIG. 3 shows Stage #2. The second stage takes the output 54 from the first stage (FIG. 2) as its input and, similarly to processing in the first stage, the brine water input 54 is supplied at approximately a pressure of 1 atm and a temperature of 60° F., with 27% TDS to a condenser 58 through a pump 56. The brine water 54 is pressurized by the pump 56 and processed by the condenser 58 (which may be a series of heat exchangers that may utilize steam from different sources, e.g., steam from preheater 60 as shown in FIG. 3 and/or excess steam from crystallizer 80 (see FIG. 5)) and the preheater 60 (which may be a series of heat exchangers to optimize the heat transfer between the steam and the waste/brine water) to a pressure of approximately 10 atm and a temperature of approximately 300° F. at an inlet 61 to a flash evaporator 62. Under certain operating conditions, the steam addition from the crystallizer 80 may be negative, i.e., steam is sent as excess to the crystallizer 90 for other uses (e.g., as a heat source for the stripper 100). The condenser 58 also outputs clean, distilled water at output 59 that is generally free from contaminants/impurities. The flash evaporator 62 generates steam from the brine water at outlet 63, which may be applied to the preheater 60. The flash evaporator 62 also processes the brine water 61 and outputs a brine water from another outlet 64 that has salts further concentrated to about 37% TDS.

Likewise, in FIG. 4 showing Stage #3 of the overall example system, the third stage takes the output 64 from the second stage (FIG. 3) as its input and, similarly to processing in the first/second stages, the brine water input 64 is supplied at approximately a pressure of 1 atm and a temperature of 60° F., with 37% TDS to a condenser 68 through a pump 66. The brine water 64 is pressurized by the pump 66 and processed by the condenser 68 (which may be a series of heat exchangers that may utilize steam from different sources, e.g., steam from preheater 70 as shown in FIG. 4 and/or excess steam from crystallizer 80 (see FIG. 5)) and the preheater 70 (which may be a series of heat exchangers to optimize the heat transfer between the steam and the waste/brine water) to a pressure of approximately 10 atm and a temperature of approximately 300° F. at an inlet 71 to a flash evaporator 72. Under certain operating conditions, the steam addition from the crystallizer 80 may be negative, i.e., steam is sent as excess to the crystallizer 90 for other uses (e.g., as a heat source for the stripper 100). The condenser 68 also outputs clean, distilled water at output 69 that is generally free from contaminants/impurities. The flash evaporator 72 generates steam from the brine water at outlet 73, which may be applied to the preheater 70. The flash evaporator 72 also processes the brine water 71 and outputs a brine water from another outlet 74 that has salts further concentrated to about 51% TDS.

The inputs and outputs of the individual stages can all be simply at 1 atm or at a pressure chosen by the process operator to optimize energy utilization within the process. Advantage can be taken within each stage to pressurize the inputs to the respective flash evaporators 50, 62, 72 to about 10 atm. The level of pressurization in all Stages is such that there is no boiling (nucleate or other type) of the waste water inside and across the heat exchanger surfaces of both the condensers and preheaters of each Stage. This prevents the formation of deposits (scales, fouling, etc.) on the heat exchanger surfaces and reduces the requirement for cleaning of the heat exchangers. This results in the reduction of the operating cost. In this example, such an increase in pressure can result in a temperature of about 300° F. input to the flash evaporators 50, 62, 72 for quicker, more efficient separation and concentration in the respective flash evaporator 50, 62, 72.

The results from any of FIGS. 2-4 yield less amounts of respective outputs for disposition to be concerned with and processed. Namely, for each 5000 lbs/hr of input 40 of Stage #1 (FIG. 2), the corresponding output 54 is only 3653 lbs/hr, including all of the salts in the input 40. Similarly, Stage #2 (FIG. 3) goes from 3653 lbs/hr at its input 54 to 2669 lbs/hr at its output 64, which Stage #3 (FIG. 4) goes from 2669 lbs/hr at its input 64 to 1950 lbs/hr at its output 74.

That reduction in mass of the three stages (which equals about 60% less than the original input) is significant and meritorious for economical and effective treatment. The exemplary system described herein includes multiple (three) concentration stages (FIGS. 2-4) that are substantially alike in the combination of equipment used. However, other exemplary systems with multiple concentration stages may have individual stages of more varied combinations of equipment as will be appreciated by one of ordinary skill in the art.

Figure 5:
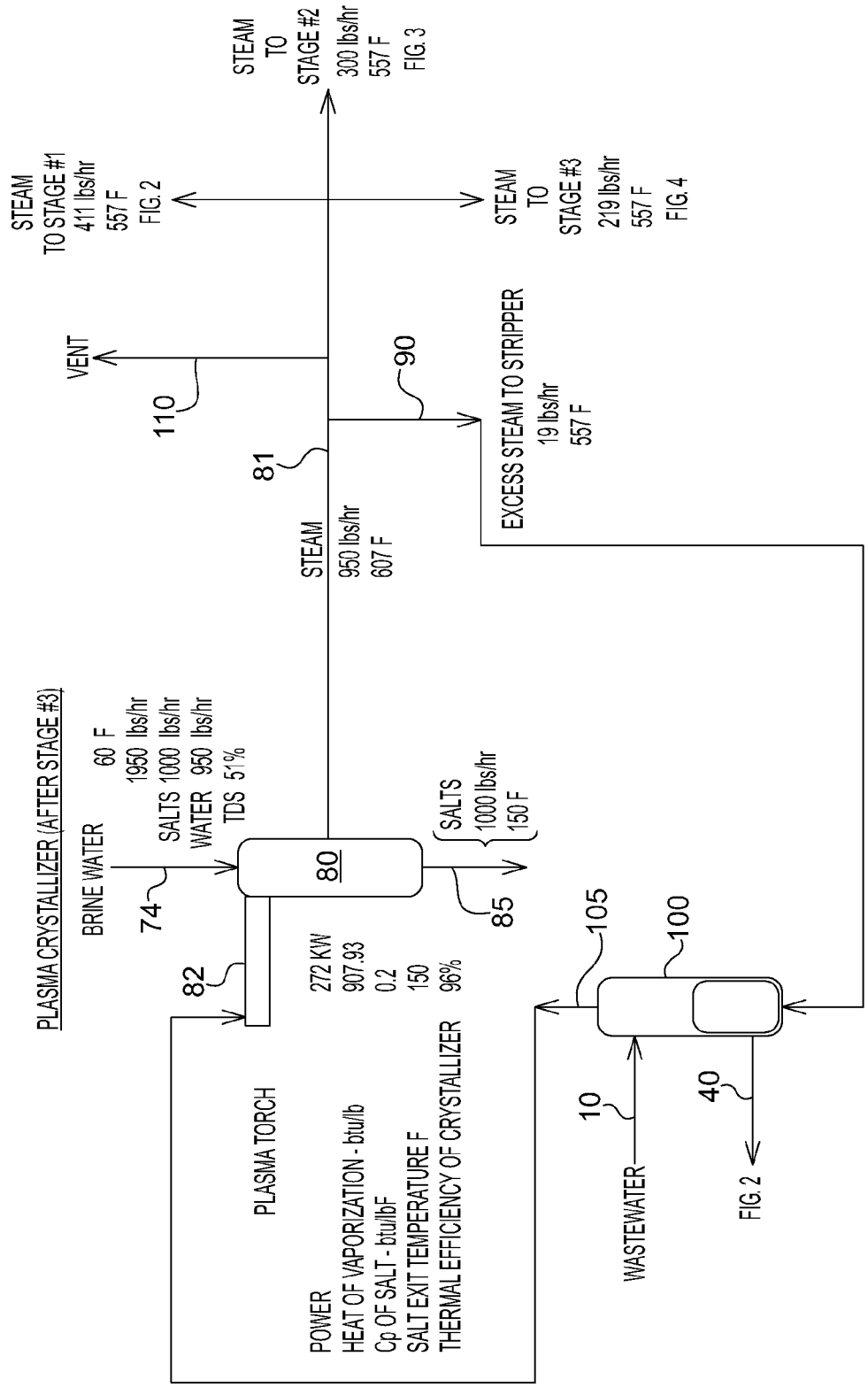
FIG. 5 is a schematic flow diagram of an exemplary thermal reactor for use in a water treatment system in conjunction with elements such as those shown in FIGS. 2-4, in accordance with the present invention.

Examples of additional aspects of the present invention will be described herein with reference to FIG. 5. FIG. 5 represents an exemplary embodiment of applying the output brine water (line 74) of the Stage #3 treatment (FIG. 4) to a plasma crystallizer 80. The plasma crystallizer 80 is an example of a known thermal reactor that can be used to finish separation of water from the salts dissolved therein. One skilled in the art will appreciate, however, that other thermal reactors may also be used without departing from the spirit and scope of the present invention. The example of a plasma reactor, which can be consistent with known plasma gasification/vitrification reactors, operated with one or more plasma torches 82, as is well-known in published literature, is believed to provide opportunity for a favorable cost-benefit ratio.

In general, in the exemplary system 5 with multistage concentration, the plasma crystallizer 80 (or other reactor) is typically utilized after the final concentration stage when the output brine water has been concentrated to the desired level, as described in the above example. It can also be suitable to have a multistage system not only for salts concentration (as in FIGS. 2-4), but also a separation subsystem with a reactor (e.g., plasma crystallizer 80) after any individual one of the early concentration stages (e.g., after either, or both, of Stages #1 and #2). However, it is generally more cost effective to have a single separation subsystem after the last of a determined number of concentration stages effective for the desired separation.

In general, any thermal reactor may be used to separate the salts and the water. A reactor operated to produce disposable salts (referred to herein as a "crystallizer") is generally suitable. Where the salts have toxicity, it is desirable to operate the reactor in a manner so they are vitrified or made into glass. Accordingly, any reference to a crystallizer herein can also include a vitrifier.

As shown in FIG. 5, the crystallizer 80 has a salts output at an outlet 85 that is equivalent to the total salts content of the original waste water. The water input to the system is now recovered as clean, distilled water from condensers of the respective stages, of FIGS. 2-4, or else recovered directly from steam exiting the crystallizer.

FIG. 5 shows the crystallizer 80 has a salts output at an outlet 85 equivalent to the total salts content of the original waste water. The water output of the total system is now recovered as clean, distilled, water from the condensers 44, 58, 68 of the respective Stages of FIGS. 2-4, and/or may be recovered directly from steam exiting the crystallizer 80.

FIG. 5 shows how steam from the crystallizer 80 can be redirected back to the respective earlier Stages of FIGS. 2-4. The steam output from the crystallizer 80 at line 81 may be provided back to the various Stages #1, #2 and #3 and used for heating by the respective heaters and preheaters therein. Also, FIG. 5 shows an "Excess Steam to Stripper" of a certain amount at line 90. This steam 90 is used in a stripper 100 which is utilized to remove, for example, Volatile Organic Compounds ("VOCs") from the waste water before processing. Some excess steam from the crystallizer 80 may also be used for other purposes, e.g., to preheat the input waste water in a condenser.

Before treatment in the Stages shown in FIGS. 2-4, the incoming waste water 10 is first, in this exemplary embodiment, sent to the stripper 100 where the steam 90 is used to remove VOCs from the waste water 10. Alternatively, the excess steam 90 may be used to preheat air in a separate heater first (not shown), and then the heated air can be used in the stripper 100. The stripped waste water 40 is sent as feed waste water to the pump 42 in Stage #1 shown in FIG. 2. The VOCs which are removed from the waste water 10 exit the stripper 100 through a conduit 105 which connects to the plasma crystallizer 80 (directly or after the VOCs are condensed out in a separate condenser and then fed as liquid through the conduit 105 to the plasma crystallizer 80). The VOCs are fed in front of the plasma torch 82 such that they intensely mix with the high temperature gases exiting from the plasma torch 82. The plasma torch 82 is operated using appropriate gas (e.g., air, oxygen, hydrogen, etc.) that will aid in, or result in, the complete destruction of the VOCs. The VOCs are substantially converted to carbon dioxide and steam. The heat generated by this conversion of VOCs to carbon dioxide and steam is utilized in the plasma crystallizer 80, along with the heat inputted through the plasma torch 82, to vaporize the water from the brine water 74. This reduces the amount of heat and corresponding amount of electricity utilized in the plasma torch 82 of the crystallizer 80, thus increasing its cost effectiveness.

The steam exiting the plasma crystallizer 80 is, in this exemplary embodiment, periodically vented to the atmosphere via conduit 110. This helps keep the levels of non-condensable gases low enough such that they do not degrade the performance of the heat exchangers used in the inventive system and process.

Figure 6:
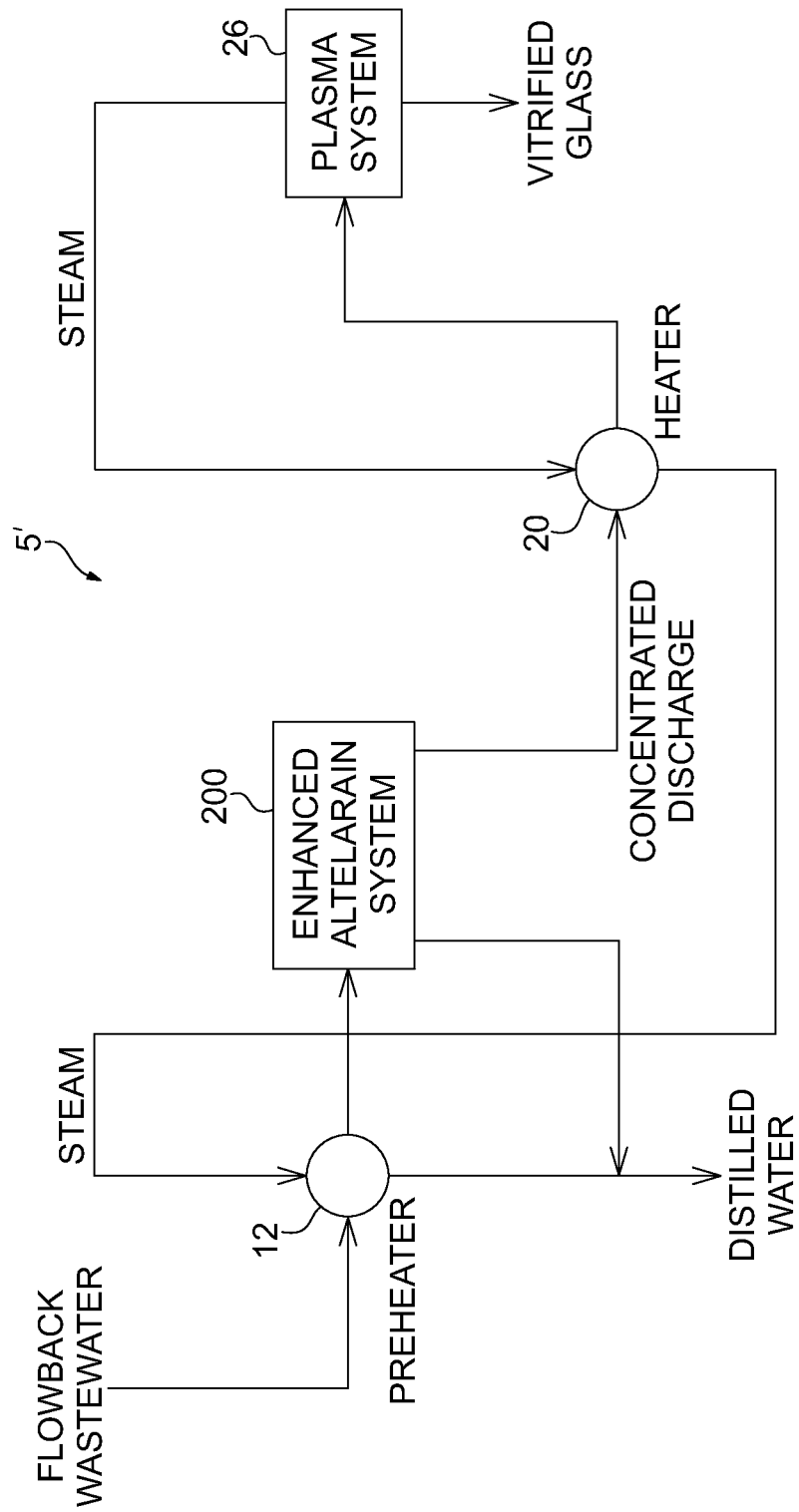
FIGS. 6 and 7 are schematic diagrams of exemplary embodiments of alternative systems that may be applied in conjunction with other commercial systems available for waste water treatment in accordance with the present invention. The other commercial systems available for waste water treatment are currently not able to treat the waste water completely enough for environmental purposes since they result in significant amount of concentrated discharge which is difficult to properly dispose of in accordance with environmental standards.
Figure 7:
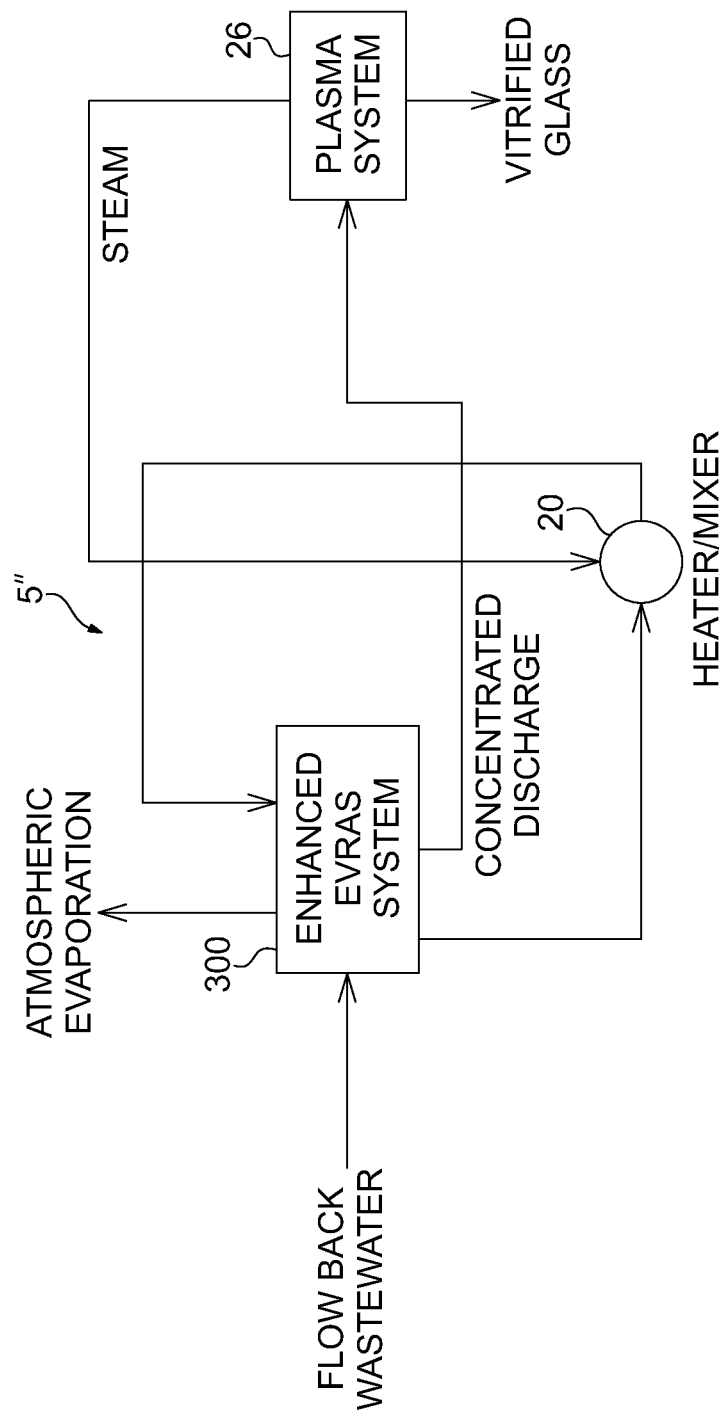

FIGS. 6 and 7 illustrate examples of alternatives to the previously described systems and methods and will be only briefly described in addition to the legends on the figures themselves. These examples utilize, with additional improvements described herein, other commercial systems available for waste water treatment which, alone, are currently not able to treat the waste water completely since they result in a significant amount of concentrated discharge that is difficult to dispose of properly.

For example, FIG. 6 shows a system 5' in which an Enhanced AltelaRain$^{SM}$ system 200, or similar system utilized to treat waste water, is between the preheater 12 and the heater 20 in which the concentrated salts discharge of the AltelaRain$^{SM}$ system 200 is heated prior to being introduced into the plasma system 26 (which may be similar to that shown and described with respect to FIG. 5). The Enhanced AltelaRain$^{SM}$ system is commercially available and is described in published literature and will not be described herein, other than that its known use concentrates waste water for discharge into an external treatment unit or for downholing, i.e., putting it into ground below an aquifier.

FIG. 7 shows a still different system 5" including an Enhanced EVRAS™ System 300 prior to introduction of a concentrated discharge (brine water) to the plasma system 26. Here, too, the EVRAS™ system is commercially available and is described in published literature. Similar to the AltelaRain$^{SM}$ system, it is known to be used to concentrate waste water for discharge into an external treatment unit or for downholing.

It is therefore seen that systems and processes in accordance with the present invention can make use of known and available components (such as, for example, flash evaporators for concentration of salts and plasma (or other) gasifier reactors for crystallization (or vitrification) of the salts) in particular innovative ways with insight as to both the capital cost and the operating cost. A need for such cost effective water treatment has been heightened by practices, such as, for example, the use of large amounts of water in natural gas drilling. However, the present invention may be used in any situation where impurities to be removed exist.

In general summary, but without limitation, the present invention can be characterized in the following ways, for example: A system, and a corresponding method, in which waste water is supplied to one or more stages of equipment including a pump for pressurizing the water (e.g., to at least about 10 times atmospheric pressure), a heater that heats the pressurized water well above normal boiling temperature, a flash evaporator, or other device, that receives the heated, pressurized water and results in fluid evaporation and concentration of solids that were in the waste water, and, for instances in which the brine water with concentrated solids cannot be otherwise readily and safely disposed of, a thermal or pyrolytic reactor is provided to crystallize or otherwise yield a form of the solids that can be readily and safely disposed of. In one form, such a reactor may also be applied as a heater for the original incoming waste water. Also, or alternatively, such a reactor may be used to form a vitrified glass of the salts output of any water treatment system that produces a brine water.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range.

I claim:

1. A method for treating waste water comprising the steps of:
   (a) receiving waste water at a first pressure between 0.8-1.2 atm and a first temperature between 48-72° F., the waste water comprising dissolved solids and volatile organic compounds;
   (b) pressurizing the received waste water to a second pressure between 8-12 atm;
   (c) heating the pressurized waste water to a second temperature between 240-360° F., wherein said heating step produces a distilled water and a pressurized/heated waste water without boiling of the waste water across heat transfer surfaces;
   wherein step (c) comprises the steps of:
   (c1) preheating the pressurized waste water to a third temperature greater than the first temperature but less than the second temperature without boiling of the waste water across heat transfer surfaces, wherein said preheating step produces the distilled water and a pressurized/preheated waste water; and
   (c2) further heating the pressurized/preheated waste water to the second temperature to produce the pressurized/heated waste water without boiling of the waste water across heat transfer surfaces;
   (d) evaporating the pressurized/heated waste water in an evaporator to remove dissolved solids by evaporation caused by depressurization of the waste water to produce a first steam and a brine water, wherein the brine water has a total dissolved solids content greater than a total dissolved solids content of the received waste water; and
   (e) crystallizing the brine water to produce a solid mass of waste product and a second steam, wherein the crystallizing step uses a plasma torch to crystallize the brine water.

2. The method of claim 1, wherein the first steam produced in step (d) is cooled to produce distilled water.

3. The method of claim 1, wherein the first steam produced in step (d) is used as a heat source in at least one of steps (b) and (c).

4. The method of claim 1, wherein steps (a)-(d) comprise a stage, and wherein the method is performed in multiple stages operating in series with the brine water output by step (d) in one stage used as the received waste water in step (a) of a next stage, and wherein the brine water output by step (d) in a last stage is input to the crystallizer at step (e).

5. The method of claim 4, wherein the brine water output in step (d) of each stage has a total dissolved solids content that is higher than that of a previous stage.

6. The method of claim 1, wherein the second steam produced by step (e) is used as a heat source in at least one of steps (b) and (c).

7. The method of claim 1, wherein the plasma torch is operated using a gas that aids in the complete destruction of the volatile organic compounds.

8. The method of claim 1, further comprising the steps of:
(b') prior to step (b), removing the volatile organic compounds from the received waste water, wherein the removed volatile organic compounds are used as a fuel by the plasma torch to crystallize the brine water.

9. The method of claim 8, wherein the second steam produced by step (e) is used as a heat source in step (b').

10. The method of claim 1, wherein the solid mass of waste product comprises vitrified glass of the salts in the brine water.

11. A system for treating waste water comprising:
a pump receiving waste water at a first pressure between 0.8-1.2 atm and a first temperature between 48-72° F. and pressurizing the received waste water to a second pressure between 8-12 atm, the waste water comprising dissolved solids and volatile organic compounds;
a preheater operatively connected to the pump and receiving the pressurized waste water from the pump and preheating the pressurized waste water to a third temperature between 240-360° F. greater than the first temperature but less than a second temperature to produce a distilled water and a pressurized/preheated waste water without boiling of the waste water across heat transfer surfaces;
a heater operatively connected to the preheater and heating the pressurized/preheated waste water to the second temperature to produce a pressurized/heated waste water without boiling of the waste water across heat transfer surfaces;
an evaporator operatively connected to the heater and removing the dissolved solids from the pressurized/heated waste water by evaporation caused by depressurization of the waste water to produce a first steam and a brine water, wherein the brine water has a total dissolved solids content greater than a total dissolved solids content of the received waste water; and
a crystallizer operatively connected to the evaporator and crystallizing the brine water to produce a solid mass of waste product and a second steam,
wherein the crystallizer comprises a plasma crystallizer and includes a plasma torch for vaporizing the water from the brine water and producing the solid mass of waste product and steam.

12. The system of claim 11, wherein the evaporator comprises a flash evaporator.

13. The system of claim 11, wherein the first steam produced by the evaporator is cooled by preheater to produce the distilled water.

14. The system of claim 11, wherein the first steam produced by the evaporator is provided to at least one of the preheater and heater is used as a heat source by at least one of the preheater and heater.

15. The system of claim 11, wherein the pump, preheater, heater and evaporator comprise a stage, and wherein the system comprises multiple stages operating in series with the brine water output by one stage used as the received waste water of a next stage, and wherein the brine water output by a last stage is input to the crystallizer.

16. The system of claim 15, wherein the brine water output by each stage has a total dissolved solids content that is higher than that of a previous stage.

17. The system of claim 11, wherein the second steam produced by the crystallizer is provided to at least one of the preheater and heater and is used as a heat source by at least one of the preheater and heater.

18. The system of claim 11, wherein the plasma torch is operated using a gas that aids in the complete destruction of the volatile organic compounds.

19. The system of claim 11, further comprising a stripper initially receiving the waste water and removing the volatile organic compounds from the waste water prior to the waste water being pressurized by the pump, wherein the removed volatile organic compounds are used as a fuel by the plasma torch to crystallize the brine water.

20. The system of claim 19, where the second steam produced by the crystallizer is provided to the stripper and is used as a heat source by the stripper.

21. The system of claim 11, wherein the solid mass of waste product comprises vitrified glass of the salts in the brine water.

* * * * *